April 29, 1952     G. W. TAYLOR     2,594,597

COVER TOP FOR TRAILER BODIES

Filed Jan. 25, 1951

INVENTOR.
GEORGE W. TAYLOR.
BY
Lockwood, Hahn, Galt & Woodard,
ATTORNEYS.

Patented Apr. 29, 1952

2,594,597

UNITED STATES PATENT OFFICE 2,594,597

COVER TOP FOR TRAILER BODIES

George W. Taylor, West Terre Haute, Ind.

Application January 25, 1951, Serial No. 207,699

2 Claims. (Cl. 296—100)

The present invention relates to improvements in closure means for open topped vehicles, primarily of the truck type, wherein there is provided an opening extending longitudinally of the truck or trailer body, substantially the full length of the body, for the purpose of loading, etc.

It is one of the objects of the present invention to provide a self-contained, easily operable means for "spreading" a tarpaulin, or like covering member, over the top opening of the truck body.

It is another object of the invention to provide a tarpaulin cover, which is permanently maintained in connection with the vehicle, and which may be readily moved to cover position or moved to open position.

It is another object of the invention to provide a means for drawing the tarpaulin taut across the top of the opening to insure a smooth top with no hollows or indentations in which water could collect.

It is a further object of the invention to provide a readily operable driving means for moving the tarpaulin into either opening or closed position.

It is a further object of the invention to provide a tarpaulin cover for the opening in the top of the trailer or truck body, which will hermetically seal this top so that the body will be practically air tight, thereby preventing loss of refrigeration in the body where such bodies are of the refrigerated type.

Figure 1:
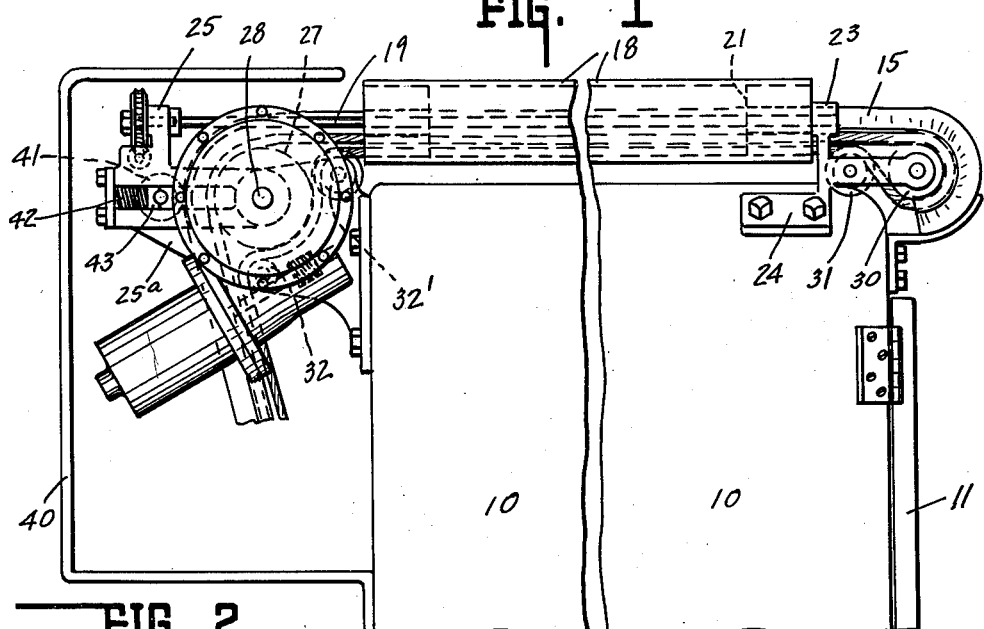
Figure 2:
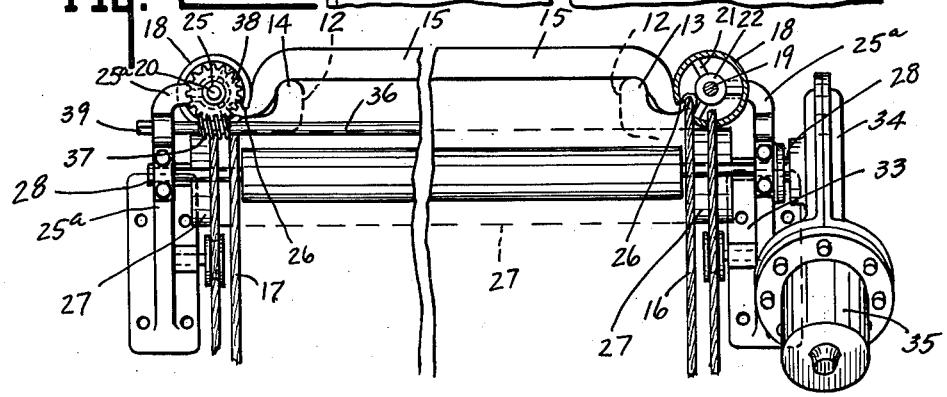
Figure 3:
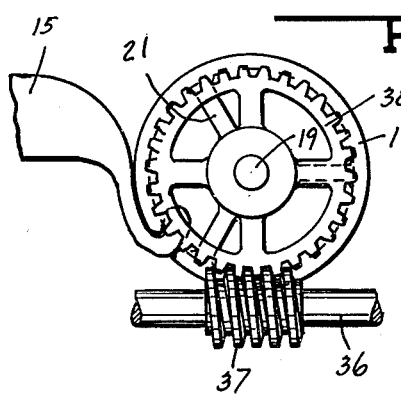

For the purpose of disclosing the invention I have illustrated an embodiment thereof in the accompanying drawings in which Fig. 1 is a side elevation of a truck body or trailer body having my improved tarpaulin cover and operating mechanism applied thereto;

Fig. 2 is an end elevation with the structure illustrated in Figure 1, parts of the same being shown in section, and Fig. 3 is a detailed enlarged view of the means for tautening the tarpaulin cover in position.

In the embodiment of the invention illustrated, the truck body 10 is of usual trailer construction having the hinged rear doors 11 and having an opening 12 in the top deck thereof. This opening is bordered longitudinally by a pair of flange or rib members 13 and 14.

The tarpaulin 15 is adapted to extend the full length of the opening from front to back and across the full width of the opening overlying the ribs 13 and 14. This tarpaulin may be of padded waterproof structure having considerable thickness and having its edges provided with side ropes 16 and 17. In actual practice the ropes 16 and 17 are secured within the looped edges of the tarpaulin structure, providing an edging for the sides of the tarpaulin structure.

Disposed on each side of the top deck of the body and extending substantially the full length longitudinally thereof are tubular guides 18. These guides are mounted on rotatable shafts 19 and 20 through the medium of suitably spaced radially disposed arms 21 mounted on hubs 22, in turn fixed on the shafts 19 and 20. By this arrangement the tubes 18 are rotatable with the shafts 19 and 20. The shafts at the rear ends are rotatably mounted in suitable bearings 23 mounted on brackets 24, secured to the truck body, and at their front ends in suitable bearings 25 mounted on brackets 25a to be more fully hereinafter described.

The beaded edges of the tarpaulin, formed by the securing of the ropes 16 and 17 in the edges, pass through slots 26 in the walls of the tubes 18, and the front ends of the ropes 16 and 17 extend considerably forward beyond the front end of the tarpaulin, passing over draw pulley 27 on a shaft 28, over which the tarpaulin is adapted to pass when it is drawn into its open position.

The rear ends of the ropes 16 and 17 pass over pulleys 30 and are then brought forward over pulleys 31 through another pocket in the tubes 18, and then pass between pressure pulleys 32 and 32' against the pulley 27.

The pulley 27 is mounted on the shaft 28 in the bracket structure 25a on one side, and a suitable bracket structure 33 on the other side. This shaft 28 is driven by suitable gear reduction drive 34 operated by an electric motor 35 mounted on the bracket structure 33.

The shafts 19 and 20 are rotatable through the medium of a rotating shaft 36 provided at its opposite ends with worm gears 37 meshing with gears 38 on the forward ends of the shafts. This shaft 36 may be rotated by a suitable crank applied to the squared end 39 to rotate the tubes 17 and 18 in either direction.

In operation, normally the tarpaulin lies in the bulkhead 40 at the front end of the truck body. When it is desired to draw the tarpaulin into position, the motor 35 is started with what may be termed a forward drive. This causes the ropes extending beyond the rear end of the tarpaulin to be drawn forward through the medium of the contact between the drawing pulleys 27 and the pressure pulleys 32 and 32'. As the rope is drawn, the tarpaulin is drawn over the roller 29 and along the top edges of the ribs 13 and 14 with the beaded edges 26 feeding through the tubes 17 and 18. This movement continues until the tarpaulin reaches its final covering position as indicated in Fig. 1, with the rear edge of the tarpaulin riding over the roller 30. When this occurs, the operator may then, by turning the shaft 36 in a direction to rotate the tubes 18 in a direction to tension the tarpaulin across the ribs 13 and 14. In this manner the tarpaulin is tightly held down against the ribs, backward rotation of the two being prevented due to the worm gear drive 37 and 38.

When it is desired to uncover the opening, the tubes 18 are rotated in the direction to loosen the tarpaulin on the ribs 13 and 14. The motor 35 is then started and driven in what may be called a reverse direction. This rotates the pulley wheels 27 in a counterclockwise direction, accordingly drawing the tarpaulin forward over the rollers 29 and depositing the same down into the bulkhead 40.

In order that the tarpaulin may be maintained smooth and unwrinkled as it moves over the roller 27, I provide a tension roller biased against the roller 27 by coiled springs 42 bearing against the bearings 43 for the roller, which bearings are mounted in the bracket structures 25a.

It is to be noted that the tubes 18, in their longitudinal position, are sufficiently high to protect, principally the edges of the tarpaulin when the same is drawn in a covering position, against engagement with obstructions projecting from either side of the roadway so that such projections will not come in contact with the tarpaulin and have a tendency to tear or injure the same.

While the invention has been illustrated and described therein in great detail, same is by way of example only and discloses the preferred embodiment of the invention, reference being had to the appended claims.

The invention claimed is:

1. The combination with an open top vehicle body and a flexible covering for closing the opening in said top, of a pair of guide members disposed longitudinally of the body and guidingly receiving the edges of the covering and means for swinging said members in a direction to tauten the cover transversely after the cover has been extended longitudinally of the opening.

2. The combination with an open top vehicle body and a flexible covering for closing the opening in said top, of means for drawing said covering longitudinally of the body guide means disposed longitudinally on the opposite sides of said body comprising tubular members having longitudinal slots therein adapted to receive the side edges of the flexible covering, and means for rotating said tubular members in one direction to tauten the flexible covering over the opening when the covering is moved to closing position.

GEORGE W. TAYLOR.

REFERENCES CITED

The following references are of record in the file of this patent:

UNITED STATES PATENTS

| Number | Name | Date |
|---|---|---|
| 1,255,809 | Stenson | Feb. 5, 1918 |
| 1,804,131 | Svihla | May 5, 1931 |
| 2,465,621 | Wheeler | Mar. 29, 1949 |